(12) United States Patent
Bittner et al.

(10) Patent No.: US 8,469,051 B2
(45) Date of Patent: Jun. 25, 2013

(54) VALVE FOR LIMITING THE TANK PRESSURE IN A MOTOR VEHICLE

(75) Inventors: Jörg Bittner, Laudenbach (DE); Stefan Hettinger, Mutterstadt (DE)

(73) Assignee: Eagle Actuator Components GmbH & Co., Weinheim (DE)

( * ) Notice: Subject to any disclaimer, the term of this patent is extended or adjusted under 35 U.S.C. 154(b) by 749 days.

(21) Appl. No.: 12/128,093

(22) Filed: May 28, 2008

(65) Prior Publication Data

US 2008/0295893 A1    Dec. 4, 2008

(30) Foreign Application Priority Data

May 29, 2007  (DE) .......................... 10 2007 025 048

(51) Int. Cl.
- *F16K 17/26* (2006.01)
- *F16K 17/18* (2006.01)
- *F16K 17/196* (2006.01)
- *F16K 24/00* (2006.01)
- *F16K 15/00* (2006.01)

(52) U.S. Cl.
USPC ...................... 137/493.4; 137/493; 137/493.5; 137/493.6

(58) Field of Classification Search
USPC ............. 137/493, 493.1, 493.6, 493.2, 512.5, 137/493.3, 493.4, 493.5
See application file for complete search history.

(56) References Cited

U.S. PATENT DOCUMENTS

| | | | | |
|---|---|---|---|---|
| 2,191,636 A | * | 2/1940 | Walker | 137/493.4 |
| 2,685,888 A | * | 8/1954 | Strauss | 137/493.6 |
| 2,986,159 A | * | 5/1961 | Snyder | 137/493 |
| 3,067,770 A | * | 12/1962 | Fancher | 137/493 |
| 3,441,050 A | * | 4/1969 | Sanchez | 137/493.6 |
| 3,613,718 A | * | 10/1971 | Ballinger | 137/493 |
| 3,971,406 A | * | 7/1976 | Inada et al. | 137/493.4 |
| 5,365,974 A | * | 11/1994 | Maravic | 137/493 |
| 5,449,018 A | * | 9/1995 | Harris | 137/493.9 |
| 5,582,198 A | * | 12/1996 | Nagino et al. | 137/43 |
| 5,778,925 A | * | 7/1998 | Cooke | 137/493.6 |
| 6,196,258 B1 | * | 3/2001 | Araki et al. | 137/493.4 |

FOREIGN PATENT DOCUMENTS

| | | |
|---|---|---|
| GB | 1 304 418 | 1/1973 |
| JP | 11-304028 | 11/1999 |

\* cited by examiner

*Primary Examiner* — John Rivell
*Assistant Examiner* — Jonathan Waddy
(74) *Attorney, Agent, or Firm* — Grossman, Tucker, Perreault & Pfleger, LLC

(57) ABSTRACT

A valve for limiting the tank pressure in a motor vehicle, comprising a first line (1) and a second line (2) which may establish a flow connection in which at least one body (3, 4) may be moved relative to another body (4, 3), whereby the movable body (3, 4) lifts up from a sealing seat (5), with regard to the object of adjusting the tank pressure using a compact design is characterized in that a first body (3), a second body (4), and the sealing seat (5) as a whole form a movable unit (6).

7 Claims, 2 Drawing Sheets

VALVE FOR LIMITING THE TANK PRESSURE IN A MOTOR VEHICLE

TECHNICAL FIELD

The invention relates to a valve for limiting the tank pressure in a motor vehicle, comprising a first line and a second line which may establish a flow connection in which at least one body may be moved relative to another body, whereby the movable body lifts up from a sealing seat.

PRIOR ART

Valves of the type referenced above are known from the prior art. An undesirably high tank pressure may develop in the tank in a motor vehicle, in particular at elevated temperatures. A limit value for the tank pressure may be approximately 300 hPa, for example. When this tank pressure is reached, the valve must open to prevent a further increase in pressure. Such valves are also used in a similar manner to prevent negative pressure from developing in the tank.

It is known from the prior art to use a valve in each case for limiting positive pressure and for limiting negative pressure. However, these devices comprising two valves are complicated to manufacture and are not very compact.

DESCRIPTION OF THE INVENTION

The object of the invention, therefore, is to provide and refine a valve of the type mentioned at the outset for limiting the tank pressure in a motor vehicle, by means of which the tank pressure may be adjusted using a compact design.

The above object is achieved according to the invention by means a valve for limiting the tank pressure in a motor vehicle, comprising a first line and a second line which may establish a flow connection in which at least one body may be moved relative to another body, whereby the movable body lifts up from a sealing seat, characterized in that a first body, a second body, and the sealing seat as a whole form a movable unit.

Accordingly, a valve of the type mentioned at the outset for limiting the tank pressure is characterized in that a first body, a second body, and the sealing seat as a whole form a movable unit.

According to the invention, it is known that a unit which as a whole is movable allows either the first body or the second body to move while the respective other body is fixed in place. By suitable selection of the particular pressure engagement surface acting on one of the two bodies, an adjustment may be made which specifies which body is moved or fixed in place in the event of positive or negative pressure in the tank. In particular, it is known that a differing design of the two movable bodies allows the movable unit to selectively respond to negative or positive pressure in the tank. Solely by the action of pressure forces on one or the other of the movable bodies it is possible to mechanically adjust whether a positive or a negative pressure develops in the tank. Furthermore, providing a single sealing seat according to the invention ensures a compact design of the valve. This results in achievement of the object stated above.

A first stop may be associated with the unit, which rests against the first body, with the second body being movable relative to the first body. Providing a first stop allows compensation to be made for the pressure force acting on the first body.

A second stop may be associated with the movable unit, which rests against the second body, with the first body being movable relative to the second body. By means of the contact of the second body on the second stop, the second body is supported against the pressure force which acts on it. As a result of this support the first body is able to move relative to the second body when the pressure force acts on the latter.

The first body and second body may be braced against one another by means of a spring. Use of a spring, in particular a coil spring or spiral spring, allows a response characteristic of the valve to be adjusted to corresponding pressure values by suitable selection of the spring constants. On this basis it is possible in particular to detect and eliminate a positive or negative pressure in the tank with an accuracy of +/−20 hPa, for example. In this case, an effectively acting pressure force must push the first and second bodies against the acting elastic force. As soon as the resulting pressure force has overcome the elastic force exerted by the spring the bodies are moved relative to one another, thereby releasing the sealing seat and allowing pressure elimination or pressure compensation to take place.

The first body and the second body may be pressed against one another via the spring in a fluid-tight manner at the sealing seat. The spring advantageously provides sealing contact of the two bodies with respect to one another. On this basis, an elastomer seal may be associated with at least one of the bodies. Elastomers are easily deformed, and therefore are able to ensure a very tight seal.

The first body may have passages which establish a fluid-conducting connection between the first line and a sealing seat chamber enclosed by the first body and the second body. By means of this particular design it is possible for a pressure that is present in the first line to act on the first body so that the first body moves relative to the second body and releases the sealing seat. A fluid may then flow out of the sealing seat chamber from the first line to the second line.

The first body may form a first pressure engagement surface having a diameter D1, and the second body may form a second pressure engagement surface having a diameter D2. By means of this particular design it is possible for a pressure engagement surface to first cause motion of the entire unit before a second pressure engagement surface causes one body to move relative to the other, after the entire unit is fixed in place.

On this basis, when the first body contacts the first stop, an effective pressure engagement surface may be formed which corresponds to the difference in the two pressure engagement surfaces. The difference in the two pressure engagement surfaces corresponds to an annular ring surface on which a pressure force may act in order to move the second body relative to the first body.

In addition, when the second body contacts the second stop an effective pressure engagement surface may be formed which corresponds to the first pressure engagement surface. First, a pressure force acts on the larger second pressure engagement surface and moves the entire unit in the direction of the second stop. The second body is then fixed in place at the second stop, so that the pressure force is then able to move only the first body and its first pressure engagement surface.

A guide may be associated with the unit. By means of this particular design the movable unit may be guided within a housing without jamming or tilting. The guide may also provide a support for the spring which braces the first body and second body against one another.

The first line may be separated from the second line in a fluid-tight manner by means of a roller diaphragm. A roller diaphragm is able to easily follow the motion of the movable unit. On this basis the roller diaphragm may be clamped to the second body, with the second body resting via a circumferential collar on an elastomer seal for the first body. This particular design allows the first line to be separated from the second line in a fluid-tight manner.

The roller diaphragm may be designed to rest against a support shoulder. This particular design prevents the roller diaphragm from forming creases when it follows the motion of the movable unit and is acted on by pressure on the side facing away from the support shoulder.

Besides a roller diaphragm, other types of membranes are possible which perform the function of the roller diaphragm.

A combination of a solenoid valve and a valve of the type described above allows the tank pressure to be electromagnetically controlled within specified positive and negative pressure limits as a result of a compact design. The solenoid valve may have a Venturi nozzle. This particular design ensures rapid elimination of pressure.

There are various possibilities for advantageously providing and refining the teaching of the present invention.

Reference is made to the subordinate claims and to the following description of one preferred exemplary embodiment of the invention, with reference to the drawings.

In conjunction with the preferred exemplary embodiment of the invention with reference to the drawings, preferred designs and refinements of the teaching are also discussed in general.

IMPLEMENTATION OF THE INVENTION

Figure 1:
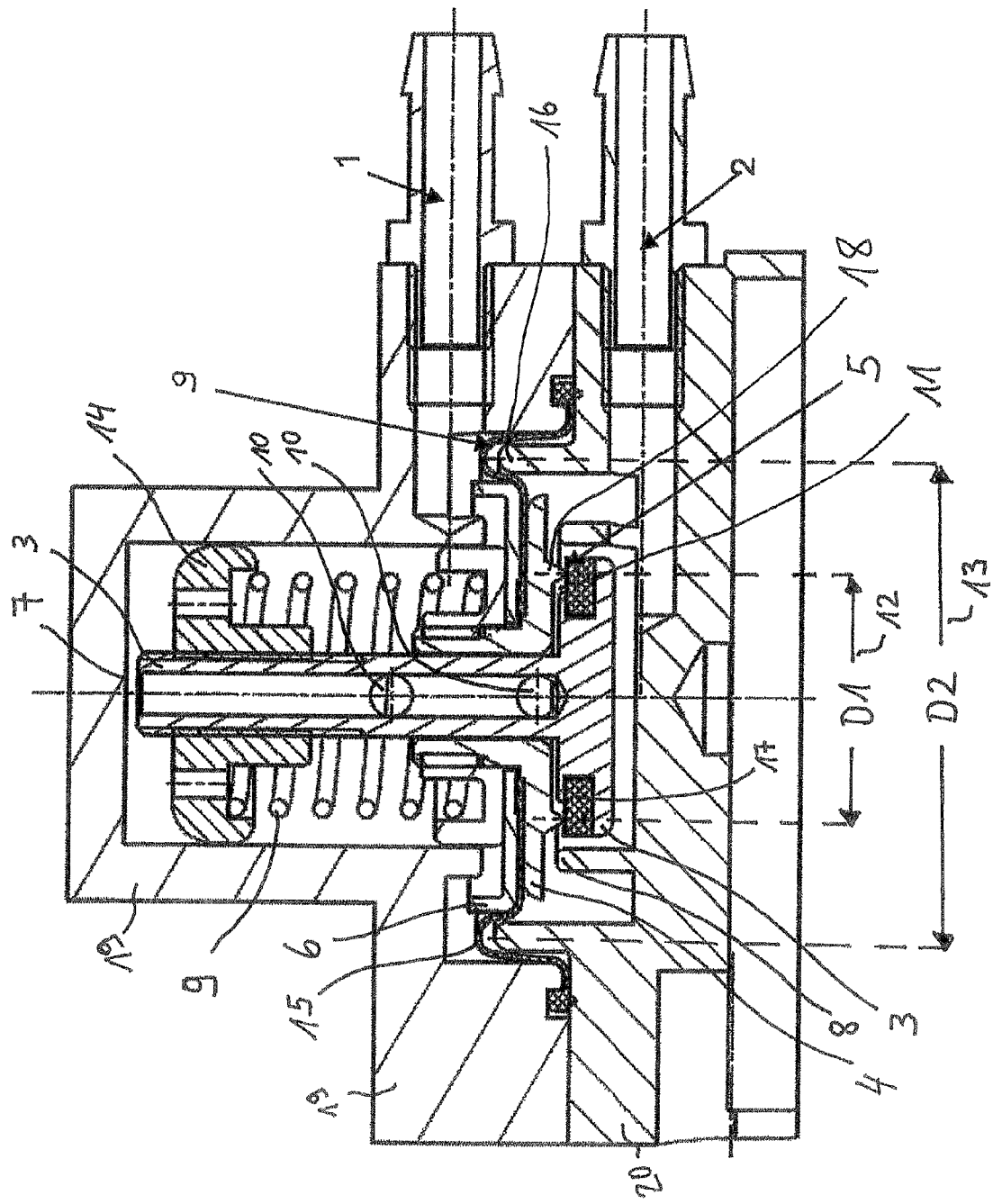
FIG. 1 shows a sectional view of a valve, having a housing containing a movable unit comprising a first body, a second body, and a movable sealing seat.

FIG. 1 shows a valve for limiting the tank pressure in a motor vehicle, comprising a first line 1 and a second line 2 which may establish a flow connection in which at least one body 3, 4 may be moved relative to another body 4, 3, whereby the movable body 3, 4 lifts up from a sealing seat 5.

A first body 3, a second body 4, and the sealing seat 5 as a whole form a movable unit 6. A first stop 7 is associated with the unit 6, and is able to rest against the first body 3. The second body 4 is movable relative to the first body 3.

In addition, a second stop 8 is associated with the unit 6 and is able to rest against the second body 4, with the first body 3 being movable relative to the second body 4.

The first body 3 and the second body 4 are braced against one another by means of a spring 9. The first body 3 is pressed against the second body 4 in a fluid-tight manner at the single sealing seat 5. An elastomer seal 17 is associated with the first body 3 at the sealing seat 5, and a circumferential collar 18 for the second body 4 rests on the elastomer seal. The collar 18 has a tapered design which allows it to penetrate the elastomer seal 17, at least in places, in a sealing manner.

The first body 3 has passages 10 which establish a fluid-conducting connection between the first line 1 and a sealing seat chamber 11 enclosed by the first body 3 and the second body 4.

The first body 3 forms a first pressure engagement surface 12 having a diameter D1. The second body 4 forms a second pressure engagement surface 13 having a diameter D2.

When the first body 3 contacts the first stop 7, an effective pressure engagement surface results which corresponds to the difference in the two pressure engagement surfaces 12 and 13. The resulting effective pressure engagement surface is an annular ring surface. Since the first body 3 rests against the stop 7, it cannot be moved further upward as viewed in FIG. 1.

However, at the effective pressure engagement surface, namely, the annular ring surface, a pressure force may cause a motion of the second body 4 relative to the first body 3, specifically, when the pressure force acting at the annular ring surface is greater than the force exerted by the spring 9. In this case the second body 4 lifts up from the sealing seat 5 and connects the first line 1 to the second line 2 in a fluid-conducting manner. In this way a negative pressure in the tank in a motor vehicle may be eliminated, specifically, when line 1 is connected to the tank in the motor vehicle and line 2 is vented to the atmosphere.

When the second body contacts the second stop 8, an effective pressure engagement surface results which corresponds to the first pressure engagement surface 12 for the first body 3. A positive pressure in the tank is not able to further move the second body 4, because the second body rests against the stop 8. However, a fluid under pressure can penetrate via the passages 10 into the sealing seat chamber 11, where it is able to act on the pressure engagement surface 12, which then acts effectively, and move the first body 3 relative to the second body 4. The first body 3 lifts up from the sealing seat 5 and connects line 1 to line 2 in a fluid-conducting manner. In this way a positive pressure in the tank in a motor vehicle may be eliminated, specifically, when line 1 is connected to the tank and line 2 is vented to the atmosphere.

In both cases, namely, positive or negative pressure in the tank, the unit 6 comprising the first body 3, second body 4, and sealing seat 5 first moves as a whole before one of the two bodies 3, 4 comes to rest against a stop 7, 8. As soon as one of the bodies 3, 4 contacts a stop 7, 8, the pressure force which now acts effectively must overcome the force of the spring 9 in order to separate the bodies 3 and 4 which are pressed together by the spring 9. As a result of separating the two bodies 3 and 4, fluid conduction is established between line 1 and line 2.

A guide 14 is associated with the unit 6, which allows the unit 6 to move in the housing section 19 without jamming or tilting. The guide 14 is used as a support or holder for the spring 9.

The first line 1 is separated from the second line 2 in a fluid-tight manner by means of a roller diaphragm 15. The roller diaphragm is clamped in the second body 4 and also between two housing sections 19 and 20. The roller diaphragm 15 is able to rest against a support shoulder 16, which is rounded. The support shoulder 16 prevents the rolling crease of the roller diaphragm 15 from folding over when it follows the motion of the unit 6.

Figure 2:
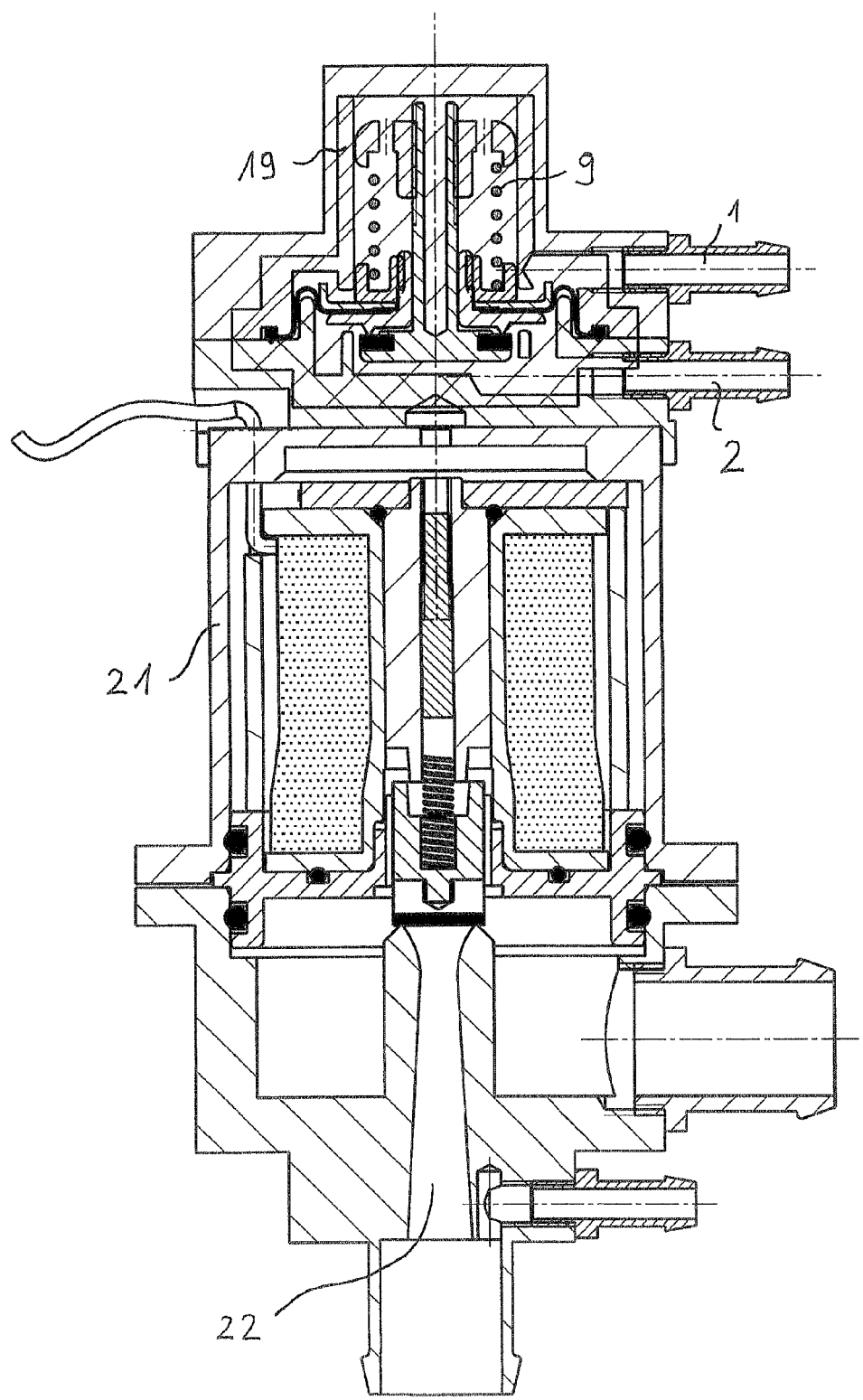
FIG. 2 shows a sectional view of a combination of a solenoid valve and a valve for limiting the tank pressure in a motor vehicle, according to FIG. 1.

FIG. 2 shows a sectional view of a combination of a solenoid valve 21 and a valve according to FIG. 1. The solenoid valve 21 may be electrically clocked, and regulates the tank pressure within the pressure limits (positive pressure or negative pressure) which the valve according to FIG. 1 permits or specifies. The solenoid valve 21 has a Venturi nozzle 22.

With regard to further advantageous designs and refinements of the teaching according to the invention, reference is made to the general section of the specification and to the claims.

Lastly, it is emphasized in particular that the above exemplary embodiment, selected completely arbitrarily, is used solely for illustrating the teaching according to the invention, which is not limited to this exemplary embodiment.

What is claimed is:

1. A valve for limiting the tank pressure in a motor vehicle, comprising a first line and a second line in a housing having two sections, wherein the first line is separated from the second line in a fluid-tight manner by means of a roller diaphragm and a single sealing seat; and a flow connection for fluid capable of being established between said first line and said second line wherein a first body is movable relative to a second body whilst said second body is fixed in place and said second body is movable relative to said first body whilst said first body is fixed in place, wherein said first body is braced against said second body via a spring and said sealing seat includes an elastomeric seal associated with said first body and a circumferential collar having a tapered design associated with said second body, wherein said first body has passages defined through said first body which establish a fluid-conducting connection between said first line and a sealing seat chamber enclosed by the first body and the second body, wherein one of said first body and said second body lifts up from said sealing seat when movable relative to the other body, and wherein said first body, said second body, and said sealing seat as a whole form a movable unit and wherein said fluid can flow out of the sealing seat chamber from the first line to the second line when said first body moves relative to said second body and fluid can flow through the sealing seat chamber from the second line to the first line when said second body moves relative to said first body and wherein the roller diaphragm is clamped to said second body and between said two housing sections and is able to rest against a rounded support shoulder that projects from the housing wall; and a guide connected to said first moveable body, wherein said guide provides a support shoulder for said spring bracing said first body to said second body and said guide interacts with said housing to guide said movable unit in said housing without jamming or tilting.

2. The valve according to claim 1, characterized in that a first stop is associated with the unit, and is able to rest against the first body, with the second body being movable relative to the first body.

3. The valve according to claim 1, characterized in that a second stop is associated with the unit and is able to rest against the second body, with the first body being movable relative to the second body.

4. The valve according to claim 1, characterized in that the first body and the second body are pressed against one another via the spring in a fluid-tight manner at the sealing seat.

5. The valve according to claim 1, characterized in that the first body forms a first pressure engagement surface having a diameter, and the second body forms a second pressure engagement surface having a diameter.

6. The valve according to claim 5, characterized in that when the first body contacts a first stop, an effective pressure engagement surface results which corresponds to the difference in diameter in the two pressure engagement surfaces.

7. The valve according to claim 5, characterized in that when the second body contacts a second stop, an effective pressure engagement surface results which corresponds to the first pressure engagement surface.

* * * * *